Patented Sept. 3, 1946

2,407,038

UNITED STATES PATENT OFFICE 2,407,038

ADHESIVE

Paul Stamberger, Dover, Del.

No Drawing. Application January 11, 1943,
Serial No. 472,021

18 Claims. (Cl. 260—23)

This invention relates to adhesives and is particularly concerned with a novel adhesive composition especially suitable as a pressure sensitive adhesive, i. e., that type of adhesive according to which a secure and firm bond is obtained by pressing together surfaces between which the adhesive material is disposed (in the absence of solvents).

One of the primary objects of the invention is to provide an adhesive having very good surface tack and bond strength.

It is also an object of this invention to provide an adhesive composition having the foregoing characteristics, which composition is economical from the standpoint of materials used, and is further readily prepared, the preparation procedure being described more fully hereinafter.

Briefly stated, the adhesive composition of this invention preferably incorporates polymerized 2-chloro-butadine 1,3 and an oil-resin mix of a certain type described more fully hereinafter.

As is known, if a butadiene product of the type mentioned above (for instance a polymerized 2-chloro-butadiene 1,3 product sold under the name of neoprene be applied to surfaces such as cloth surfaces, for instance by calendering or spreading from a solution or dough, such coated surfaces when pressed together will not adhere, since the neoprene surface is quite dry and is almost completely lacking in surface tack. This also applies to other synthetic rubber-like materials composed of polymerized butadiene materials and their derivatives.

On the other hand, oil-resin mixes, by themselves, are likewise unsatisfactory as adhesive materials, especially for pressure sensitive adhesives, since while such materials may be prepared to have appreciable surface tack, at the same time the strength of the bond secured is very low.

I have found that by combining certain types of oil-resin mixes with neoprene, or other products of the type of polymerized 2-chloro-butadiene 1,3, or similar synthetic rubber-like materials, for instance the copolymer of butadiene and styrene, an adhesive is secured having an exceptionally high surface tack while, at the same time, retaining most of the strength of the synthetic rubber-like material. The bond which may be provided by this adhesive is of great strength and, as shown below, may even be treated so as to manifest a degree of adhesion such that if applied to layers of cloth or fabric, the cloth or fabric will itself tear before the bond will yield.

In the preferred adhesive composition according to this invention, the oil-resin mix is vulcanized. This may be accomplished in accordance with various known vulcanization methods. Heating with sulfur is preferred for most purposes. Thereby, an exceptionally high degree of tack and bond strength is secured, provided that the degree of vulcanization is in accordance with that specified below.

In considering the composition of my improved adhesive, attention is first directed to the nature of the oil-resin mix which I prefer to employ. The oil part of this mix may comprise any of the long chain fatty acid esters, either natural or synthetic, a typical example being fatty oils, i. e., natural glycerin esters of fatty acids. Examples of such oils are rapeseed oil, linseed oil, castor oil, soya bean oil, etc. The resinous part of the oil-resin mix preferably comprises rosin or resins incorporating rosin, such as rosin esters, hydrogenated rosins or esters thereof, and modified rosins, such as rosin-modified maleic resins and rosin-modified phenolic resins.

For various purposes, the ratio of rosin to oil may be varied over quite a wide range, for instance the rosin (or similar resinous material) may constitute from about 60% to about 10% of the non-volatile part of the oil-resin mix. However, since the resinous ingredient contributes greatly to surface tack and the film strength, I prefer to employ that ingredient in amounts upwards of about 30% of the non-volatile part of the oil-resin mix. One satisfactory mix containing at least 40% of the rosin component. To achieve best results the maximum should not be above about 50%.

According to the invention, it is desirable that the oil-resin mix have substantial body, for instance heavier than about V on the Gardner scale.

Satisfactory heavy body may be achieved by heating or cooking the oil and resin ingredients of the mix together in the general manner followed in preparation of oil-resin varnishes, the temperature employed being one capable of effecting heat bodying, for example from about 270° C. to about 350° C. The time and temperature of cooking and thus the degree of bodying attained should be controlled, in accordance with the characteristics desired in the particular adhesive being prepared.

Heavy body may also be attained by employing a heavily heat bodied oil in initially preparing the oil-resin mix, in which event the time and/or temperature of cooking may be reduced, or the cooking may even be eliminated, especially if the mix is to be vulcanized, as is the preferred practice.

Although the oil-resin mix (at least when said mix has heavy body without vulcanization) may be added to the neoprene or similar material without further treatment, and an adhesive thereby secured which is quite satisfactory for certain purposes, as indicated above, the preferred practice of this invention contemplates further treatment of the oil-resin mix prior to mixing with the neoprene. Thus, gelation or vulcanization are advantageously employed, especially the latter, so as to obtain high surface tack and bond strength.

Solvents may be employed at various stages depending upon the method of preparation of the materials. For instance solvents may be used for dilution after completion of vulcanization or heat bodying.

It is of advantage to employ oil-resin mixes made with semi-drying fatty acid esters, for instance, oleic acid esters, since these will not readily lose tackiness on exposure to air, and therefore impart a greater effective life to the adhesive. In this case, however, it is of importance to adopt the procedure where the oil-resin mix is vulcanized, in order to sufficiently increase the body.

For vulcanization, sulfur may be employed over a fairly wide range, depending upon the nature of the materials employed and the treatment thereof prior to vulcanization, for instance the degree of heat bodying, if any, of the oil. In general, materials having a heavier body require a smaller amount of sulfur than do materials having a light body. For most purposes, from about 5% to about 20% of sulfur will be found satisfactory. Vulcanization temperatures may also be varied depending on the nature of the materials and the result desired although usually temperatures from about 120° C. to about 180° C. will be found satisfactory.

With regard to vulcanization, it is of importance that the quantity of sulfur and the time and temperature of vulcanization be such as to avoid vulcanization to that degree or stage where a solid, infusible, or dry product is obtained. The degree of vulcanization contemplated is such as to produce a sticky, fluid, or thermoplastic mass. This can be achieved by interrupting the heating with sulfur shortly after the sulfur has combined with the oil, so that substantially no sulfur will separate on cooling; or the heating can be continued until the vulcanized oil-resin mix will display very rapid or spontaneous solidification in a concentrated aqueous ammonia solution. This will occur during stages of vulcanization short of that stage producing a solid, crumbly, infusible mass. Furthermore, a soft sticky gel useable in accordance with the invention may be secured by permitting the degree of vulcanization to proceed even somewhat beyond that marked by the ammonia test just described, especially if the heating be interrupted suddenly, substantially at the critical point where the gel is just formed. When the material reaches the stage of a solid infusible mass, it can no longer be further solidified by heating under normal vulcanization.

After preparation of the oil-resin mix, it is then combined with the butadiene product. With regard to the proportions of the oil-resin mix and the polymerized butadiene product, it may be said that here again considerable variation is permissible for various different purposes, for instance the oil-resin mix may comprise anywhere from 5% to 70% of the butadiene product. Increasing the quantity of oil-resin mix will, in general, increase the surface tack, but will decrease the strength of the bond, so that the composition should be adjusted in accordance with the characteristics desired in the adhesive being prepared. For certain purposes where a very high degree of tack is of importance and strength is not so vital the oil-resin mix may constitute even more than 70% of the butadiene product. In fact, even quite a small percentage of the butadiene product will still contribute some strength. Thus, for instance, a composition incorporating 10% of the butadiene material and 90% of the oil-resin mix can be used for some purposes, especially where the oil-resin mix is vulcanized.

I have found that very good bond strength may be obtained when employing the oil-resin mix up to about 30% of the quantity of the polymerized 2-chloro-butadiene 1,3 (or other similar butadiene product). It may be noted that substantial surface tack is provided even by as little as about 10% of the oil-resin mix. A particularly satisfactory operable range has been found from 15% to 30% of the oleoresinous mix.

The two major ingredients of the adhesive may be brought together and mixed in various ways. According to one such method contemplated herein, the oil-resin mix and the neoprene are milled together on a roller type mill, until a thorough admixture is obtained. An alternative procedure is to dissolve the synthetic rubber-like material in a suitable solvent and then add the oil-resin mix to the solution. The oil-resin mix may be added to said solution either directly or, if desired, said mix may be first diluted with a suitable solvent and this solution then added to said rubber solution.

*Example 1.*—Alkali refined linseed oil and a rosin ester (Staybelite No. 10, a glycerol ester of hydrogenated rosin) in proportions of 1—1 were heated together for about three hours between about 290° C. and 300° C., whereupon this oil-resin mix attained a viscosity higher than Z—6 on the Gardner scale. The viscosity was such that about a twelve inch string could be drawn from a flat plate.

Fifteen parts of the bodied oil-resin mix were then combined with 85 parts of neoprene GN. The mixing of these ingredients was effected after solution of the neoprene in toluene. Toluene is a well-known varnish solvent, in which both neoprene and the oleoresinous mix are soluble.

The foregoing yielded an adhesive satisfactory for many purposes, for instance for combining synthetic rubber sheets, or for adhesive tape adapted for use on another similarly coated surface.

*Example 2.*—In this example the same oil-resin mix referred to in Example 1 above was employed (following cooking). The cooked oil-resin mix was further subjected to vulcanizing treatment by heating the same with 10% of sulfur at about 150° C. The heating was continued for about three hours, until no more sulfur separated on cooling, thereby securing a mass which was semi-solid at room temperature, of darkish color, which mass, however, may be made quite liquid by heating to 60–80° C.

20 parts of this vulcanized material was milled on a roller mill with 80 parts of neoprene GN.

After thorough admixture a solution of the adhesive in toluene was prepared, containing 40% solids and this was applied to fabric. After evaporation of the solvent, an adhesive layer remained, which layer, although quite dry to the touch, displayed a high tack and bond strength when two parts of the fabric coated with the adhesive compound were brought together under pressure.

In the case of the adhesives incorporating vulcanized oil-resin mixes, as preferred in accordance with this invention, the bond between two surfaces for instance between two layers of fabric, may be vulcanized by applying heat, in which event such bond becomes virtually permanent and, in the case of fabric, cannot even be pulled apart without tearing the fabric.

Although for certain purposes other ingredients may be incorporated in the adhesive, this is ordinarily not necessary and, in fact I prefer a composition consisting essentially of polymerized 2-chlorobutadiene 1,3 and the oil-resin mix above described.

It may be mentioned that the adhesives may be prepared by separately placing the oil-resin mix and the butadiene product in aqueous emulsions or dispersions, and then combining such dispersions. On the other hand, the adhesives may be dispersed after preparation thereof.

It is to be understood that synthetic rubber-like materials similar to polymerized 2-chlorobutadiene 1,3 may also be used and are comprehended within the scope of the claims, even though such other materials may have somewhat different chemical composition (for instance, may not be chlorine products), especially where the rubber-like material contributes good strength to the adhesive.

I claim:

1. A composition of matter comprising polymerized 2-chloro-butadiene 1,3, and from about 5% to about 70% (based on the content of said butadiene material) of a preformed, vulcanized, thermoplastic, sticky, oil-resin mix having from about 5% to about 20% of sulfur, a rosin, and a long chain unsaturated fatty oil, the rosin component comprising from about 10% to about 60% of the mixture of oil and resin and the fatty oil component constituting the balance thereof, said composition being characterized by a high degree of surface tack and adhesive strength.

2. A composition of matter in accordance with claim 1 in which the fatty oil is a semi-drying fatty oil.

3. A composition of matter in accordance with claim 1 in which the rosin ingredient of said oil-resin mix is hydrogenated rosin.

4. A composition of matter in accordance with claim 1 in which the oil-resin mix comprises not more than about 50% of the polymerized 2-chloro-butadiene 1,3.

5. A composition of matter in accordance with claim 1 in which the rosin of said oil-resin mix comprises at least 40% thereof.

6. A composition of matter in accordance with claim 1 in which the oil-resin mix comprises not more than about 50% of the polymerized 2-chloro-butadiene 1,3, and in which the rosin of said oil-resin mix comprises at least 40% thereof.

7. A composition of matter comprising polymerized 2-chloro-butadiene 1,3, and from about 5% to about 70% (based on the content of said butadiene material) of a sticky mixture of oil and resin preblended by cooking at oil-bodying temperatures to a viscosity heavier than about V on the Gardner scale, said mix having a rosin component and a long chain unsaturated fatty oil component, the rosin component comprising from about 10% to about 60% of the mixture of oil and resin and the fatty oil component constituting the balance thereof, the composition having an appreciable viscosity and being characterized by a high degree of surface tack and adhesive strength.

8. A composition of matter in accordance with claim 7 in which the fatty oil is a fatty oil having drying properties.

9. A composition of matter in accordance with claim 7 in which the rosin component of said oil-resin mix is hydrogenated rosin.

10. A process for making an adhesive which comprises preparing an oil-resin blend having from about 10% to about 60% of a rosin component and a long chain unsaturated fatty oil component constituting the balance of said blend of oil and resin, heat-bodying the blend to increase its viscosity but not so far as to a solid and infusible state, and thereafter mixing said heat-bodied blend with polymerized 2-chloro-butadiene 1,3, in proportions such that said blend comprises from about 5% to about 70% of the quantity of butadiene material.

11. A process in accordance with claim 10 in which the mixing of the polymerized 2-chloro-butadiene 1,3, with the heat-bodied oil-resin blend is effected by milling on a roller mill.

12. A process in accordance with claim 10 in which the mixing of the polymerized 2-chloro-butadiene 1,3, with the heat-bodied oil-resin blend is effected by dissolving the butadiene material in a solvent, which solvent is also a solvent for said mix, and adding the heat-bodied mix to the butadiene solution.

13. A process in accordance with claim 10 in which the mixing of the polymerized 2-chloro-butadiene 1,3, with the heat-bodied blend is effected by separately dissolving both said butadiene material and said heat-bodied blend in solvents and thereafter mixing the two solutions.

14. A process for making an adhesive which comprises preparing an oil-resin mix having from about 10% to about 60% of a rosin component and a long chain unsaturated fatty oil component constituting the balance of said mixture of oil and resin, heating said mix, and sulfur-vulcanizing the same, the degree of vulcanization being short of that stage providing a solid and infusible mass, and incorporating the heated and vulcanized oil-resin mix so formed with polymerized 2-chloro-butadiene 1,3, in proportions that such oil-resin mix comprises from about 10% to about 70% of the quantity of butadiene material.

15. An adhesive comprising polymerized 2-chloro-butadiene 1,3, and from about 15% to about 30% (based on the content of said butadiene material) of a previously heat-bodied and sulfur-vulcanized thermoplastic oil-resin mix of sticky consistency, having from about 5% to 20% sulphur, rosin comprising from about 40% to about 60% of the mixture of oil and rosin and a long chain fatty oil constituting the balance thereof.

16. An adhesive comprising polymerized 2-chloro-butadiene 1,3, and from about 5% to about 70% (based on the content of said butadiene material) of a preformed heat-bodied sticky oil-resin mix comprising a long chain fatty oil and rosin, the rosin comprising from about 10% to about 60% of the mixture of oil and rosin, the oil constituting the balance thereof.

17. An adhesive comprising polymerized 2-chloro-butadiene 1,3, and a preformed heavily bodied oil-resin mix having rosin and a long chain fatty oil, the rosin comprising from about 10% to about 60% of said oil resin mix, the remainder of said mix being oil, said composition being characterized by a high degree of surface tack and adhesive properties.

18. An adhesive in accordance with claim 17 in which the preformed heavily bodied oil-resin mix is a thermoplastic sulfur vulcanized mix.

PAUL STAMBERGER.